United States Patent [19]
Brecy

[11] 3,769,156
[45] Oct. 30, 1973

[54] INSTALLATION FOR MEASURING AND CONTROLLING A NUCLEAR REACTOR

[75] Inventor: Jean Brecy, Montrouge, France
[73] Assignee: Framatone, Paris, France
[22] Filed: Aug. 30, 1971
[21] Appl. No.: 176,197

[52] U.S. Cl. .................................................. 176/19
[51] Int. Cl. ........................................... G21c 17/06
[58] Field of Search ...................................... 176/19

[56] References Cited
UNITED STATES PATENTS
3,025,226   3/1962   Martin et al. ...................... 176/19 R
3,519,534   7/1970   Ghilardotti et al. ................. 176/19 R Primary Examiner—Reuben Epstein
Attorney—William B. Kerram, Jr.

[57] ABSTRACT

An installation for measuring and controlling a nuclear reactor of which the core is situated in a pressurised reactor vessel surrounded by a shielding enclosure, comprises measuring apparatus which is situated in a measuring room outside the shielding enclosure and at a level below that of the opening plane of the vessel, the apparatus being connected to movable detectors each displaceable inside a guide tube capable of penetrating into the core by sliding in a channel, each channel being connected at one end to the vessel bottom and at the other end leading into the measuring room, the other end of each channel including a device which is capable of providing an adjustable seal between the inner surface of the channel and the outer surface of the associated guide tube.

7 Claims, 5 Drawing Figures

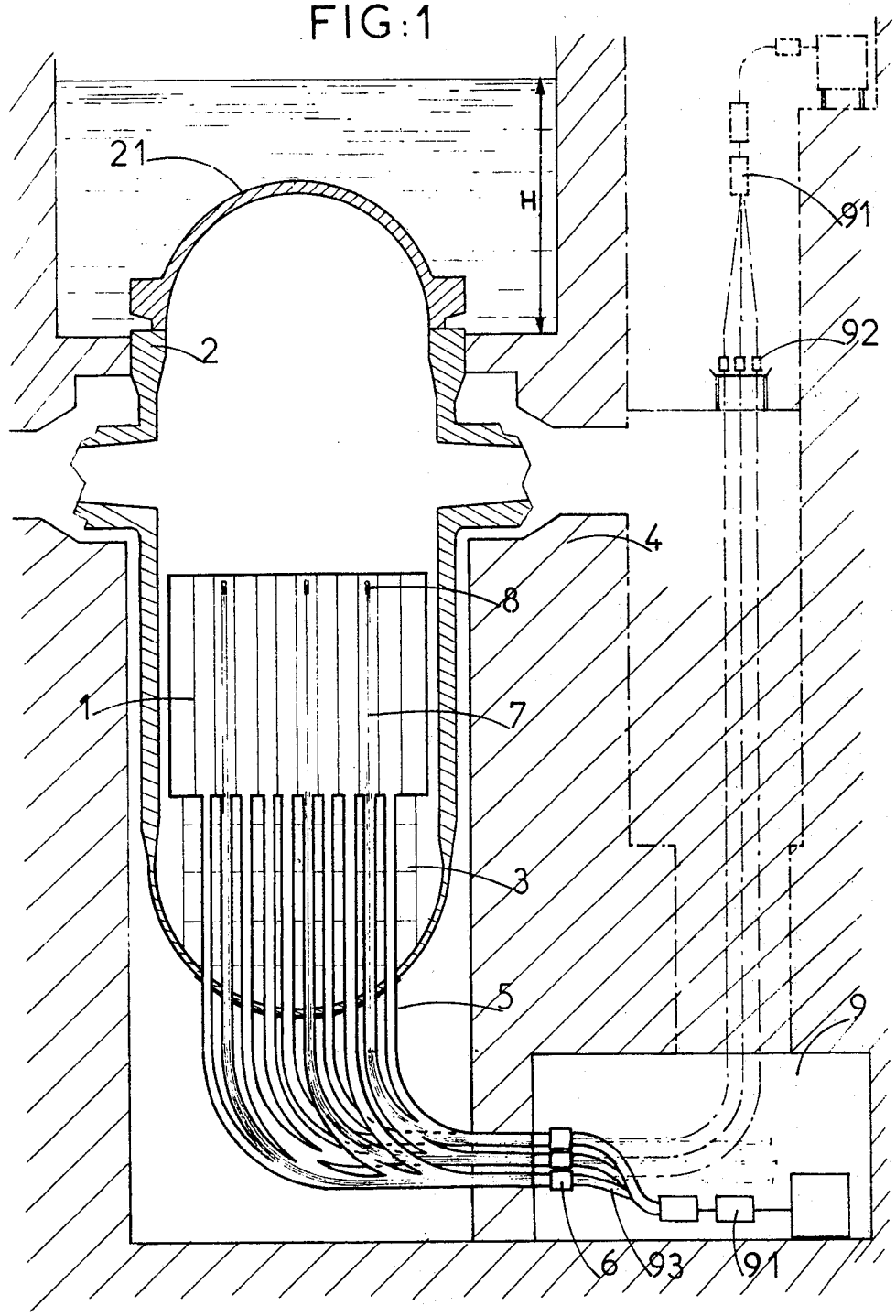
FIG:1

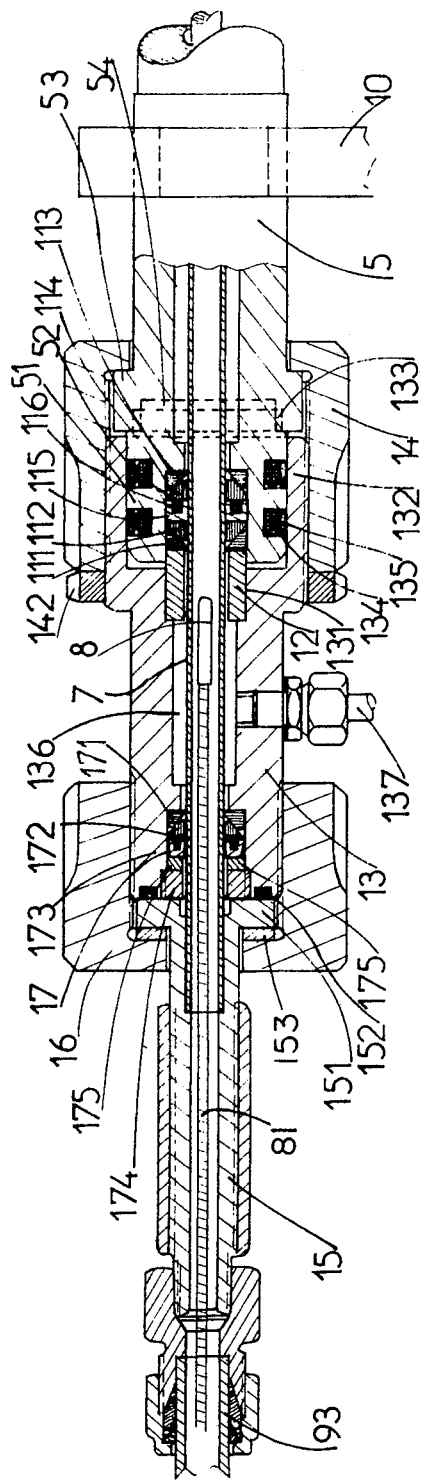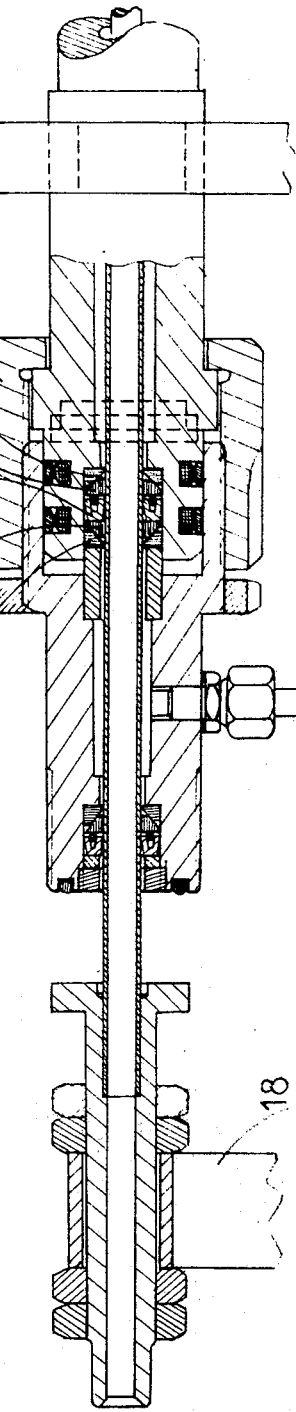

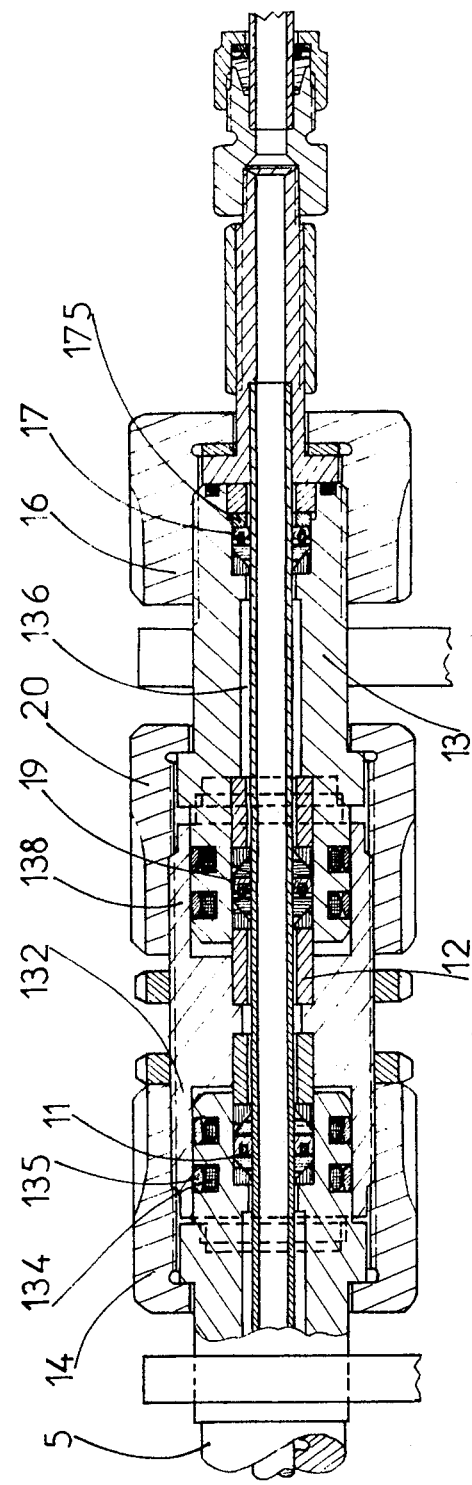
FIG:4
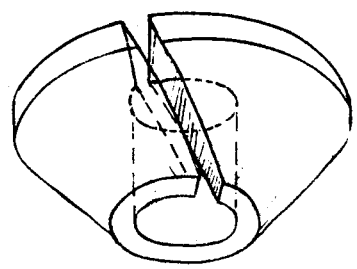
FIG:5

INSTALLATION FOR MEASURING AND CONTROLLING A NUCLEAR REACTOR

The invention relates to improvements in an installation for measuring and controlling a nuclear reactor of which the core is situated in a pressurised reactor vessel surrounded by a shielding enclosure.

The operation of a nuclear reactor is usually monitored by neutron flux measuring instrumentation introduced into the core. This instrumentation consists of detectors which can be moved into different sites in the fuel charge during operation of the reactor. The detectors are connected to flux measuring apparatus situated in a measuring room inside the shielding enclosure. They are generally moved inside a plurality of guide tubes which penetrate into the core and which are closed at the end. Since the upper part of the reactor vessel is designed to receive the fuel charging installations and is also closed with a detachable cover, the guide tubes are usually introduced through the bottom of the vessel and run in the internal structures which support the fuel assemblies.

During handling of the fuel elements, it is essential to withdraw the guide tubes from the core. For this reason the tubes are designed to be slidable so that the tube length situated inside the vessel can be pulled out towards the measuring room. To this end the guide tubes slide in channels which are connected to the vessel bottom and lead into the measuring room. These channels are each provided at the measuring room end with a device which provides a static seal between the inner surface of the channel and the outer surface of the guide tube and which can withstand the pressure exerted by the primary coolant inside the vessel of the reactor. Thus the guide tube, being closed at the end within the reactor, forms part of a fluid-tight envelope separating the high-pressure primary fluid from the air at atmospheric pressure inside the tube and measuring chamber. The detector is thus in air at atmospheric pressure. The sealing devices generally used prevent sliding of the tube, which must not shift during operation of the reactor. When the vessel is open for handling of the fuel elements, the primary fluid is not pressurised, but some pressure remains, of course, due to the head of fluid contained in the vessel, and, in the case of water-cooled and/or water-moderated reactors, due to a considerable head of water maintained above the reactor vessel as biological shielding. Since this water is contaminated, a seal must be maintained during sliding of the guide tubes. For which reason the measuring room is generally above the level of the surface of the water retained in the shielding enclosure so that the static sealing device which acts during operation of the reactor can be slackened on shut-down of the reactor without any risk of leakage.

This arrangement makes it necessary to extend all the instrumentation so that measuring room can be sited above the water level, and obliges the designer to put the measuring room at a level which is already greatly encumbered with the auxiliaries, since the primary circuit, in particular, must for safety reasons be situated above the core.

According to the present invention there is provided an installation for measuring and controlling a nuclear reactor of which the core is situated in a pressurised reactor vessel surrounded by a shielding enclosure, the installation comprising measuring apparatus located in a measuring room outside the shielding enclosure and which is connected to a movable detector displaceable within a guide tube capable of pentrating into the core by sliding in a channel of which one end is connected to the vessel bottom and the other end is connected to the measuring room, the channel being embedded in the shielding enclosure in a fluid-tight manner, wherein the measuring room is at a level below that of the opening plane of the vessel and the other end of the channel includes a device which is adapted to provide an adjustable seal between the inner surface of the channel and the outer surface of the guide tube, the device being adjustable between a first condition in which it is capable of withstanding the pressure inside the vessel during operation of the reactor, while in a tube locking position, and a second condition in which it will permit sliding of the guide tube during shut-down of the reactor.

An embodiment of the invention will now be described, by way of example only with reference to the accompanying drawings, in which:

FIG. 1 is a diagrammatic transverse section through a nuclear reactor provided with an installation embodying the invention;

FIG. 2 is a cross-section through a sealing device in the condition in which the guide tube is locked;

FIG. 3 is a cross-section through the sealing device of FIG. 2 in the condition permitting sliding of the guide tube;

FIG. 4 is a cross-section through a varient of the sealing device; and

FIG. 5 is a perspective view of a detail, viz. a biconical seal.

In FIG. 1 chain lines represent the usual measuring apparatus arrangement.

The core of the nuclear reactor 1 is placed inside a pressurised reactor vessel 2 closed with a detachable cover 21 and rests on internal structures 3. The vessel 2 is situated in a concrete shielding enclosure 4. Channels 5 fixed to the bottom portion of the vessel 2 extend as far as a measuring room 9. In the conventional arrangement indicated by chain lines, channels 5 extend to adjacent the top of the vessel. Guide tubes 7, closed at their ends, are slidable inside the channels and, in passing into the internal structures 3, penetrate into the interior of the core 1. The channels 5 are provided in a known manner with a plurality of switching points to enable the number of channels to be reduced and the installation comprises a channel selector 91 to enable the detecting instruments to be introduced into the desired channels. The detector 8 is generally mounted on the end of a coiled cable 81 wound on to a drum and capable of causing the detector to move along inside the guide tube.

During operation of the reactor with the conventional arrangement, the primary fluid contained inside the reactor vessel is pressurised and fluid-tightness between each channel and the associated guide tube is ensured by a static sealing device 92 which locks the guide tube in position. When the fuel is to be handled, the primary fluid is brought back to atmospheric pressure and the cover 21 is removed. The sealing device 92 is then slackened and a length of each guide tube equal to the depth of the core can be pulled into the measuring room so that the guide tubes are withdrawn from the core and will not be damaged during handling of the fuel elements. Thereafter the seal is restored so that the open reactor can be submerged under a layer of water of thickness H for the purpose of biological shielding. These operations naturally take a fairly long time. The measuring apparatus could, of course, be placed above the water level by raising the level of the measuring room.

In accordance with the invention, and as shown in solid lines in FIG. 1, the measuring room is at a level below the opening plane of the reactor vessel. As a result the length of the channels 5, guide tubes 7 and coiled cables 81 is considerably reduced. A special adjustable sealing device 6 is located at the exit from each channel 5 and is such as to provide, in a first condition, a complete seal against the primary fluid pressure (for example, 150 bars) during operation of the reactor and, in a second condition provided merely by slackening the sealing device, a seal against a pressure of the order of 3 bars due to the head of water provided as biological shielding, while still permitting sliding of the corresponding guide tube 7.

This arrangement makes it possible to clear a considerable space at the level of the vessel for placing and handling the reactor equipment. Also, the reduction in the lengths of the guide tubes 7 and coiled cables permits an increase in the accuracy of positioning of the associated measuring detectors. In addition the force required to shift each guide tube and the risk of the latter jamming in a channel are reduced due to the reduction in the channel length and the elimination of one bend. Lastly, the horizontal position of the guide tubes inside the measuring room provides easier access to the guide tubes and facilitates extraction operations.

An embodiment of the sealing device 6 is shown in FIGS. 2 and 3.

Each channel 5 is attached to a fixed support 10 and bedded in a fluid-tight manner in the enclosure 4. At the end 51 of the channel there is an annular chamber 52, open on its outer face and surrounding the guide tube 7. A seal 11 inside the chamber 52 is formed of two pairs of male and female frusto-conical rings 111, 112 and 113, 114, mating at their conical surfaces. Between the pairs of seals there is a scraper seal 115 formed of an annular member with a U-shaped cross-section, the two arms of the U extending parallel to the channel axis. A spacer ring 116 is placed between the two arms.

A clamping ring 12, slidable on the guide tube 7 and extending into the chamber 52, enables the seal 11 to be compressed. This ring 12 is clamped by means of a sliding sleeve 13 surrounding the guide tube 7 and formed with a recess 131, on the base of which the ring 12 bears, and an enlarged end portion 132 which slides on the end 51 of the channel 5.

A nut 14, bearing on a flange 53 on the end of channel 5, is screwed on to the threaded outer surface of the end portion 132 to permit displacement of the sleeve 13 and clamping of the seal 11. Rotation of the sleeve 13 is prevented by extensions 133 with milled internal surfaces sliding on corresponding spot-faces 54 on the channel 5.

An additional seal is provided between the end portion 132 and the channel end 51 by two outer seals, positioned in grooves in the channel end 51 and each formed of an O-ring seal 134 of resilient material pressing on a shear-resistant ring 135 bearing on the inner face of the end portion 132.

The end of the guide tube 7 is brazed to a connecting piece 15, provided at its end with a flange 151 forming an abutment for the end of the sleeve 13. A simple static safety seal for high-pressure reactor operation is provided by an O-ring seal 152, positioned in a recess in the end of the sleeve 13, and clamped by a nut 16 screwed on to an external thread on the end of the sleeve 13 and bearing on the flange 151 through a self-lubricating washer 153, made of a steel/"Teflon" (Trade Mark) complex, so that no torque is transmitted to the guide tube or connecting piece 15 and so that the guide tube will not turn during tightening of the nut 16.

A leak detection chamber 136 is provided in the central portion of the sleeve 13, between the seal 11 and a second sliding seal 17 similar to the seal 11 and formed of a male and a female frusto-conical ring 171, 172 and of a scraper seal 173 which are slightly compressed by an externally threaded member or screw 174 on a sliding ring 175 to provide a low-pressure seal and wiping of the guide tube 7 during its sliding movement. Alternatively, of course, the screw 174 can be tightened further to make the seal 173 fluid-tight at higher pressures. A plug 137, connected to a duct leading into the chamber 136, enables any leakage to be detected and drained and, if the leakage is abnormally high, enables a non-active fluid such as deionised water to be injected into the chamber.

As shown in FIG. 1 in solid lines the guide tubes 7 are extended as far as a channel selector 91 and the measuring apparatus by detachable channels 93 which are connected to the connecting pieces 15.

During operation of the reactor, each flange 151 is applied to the O-ring seal 152 by tightening the nut 16. The nut 14 is tightened to a predetermined torque, depending on the characteristics of the materials with a torque spanner, to provide a high-pressure seal without risking deformation of the guide tube 7, and is locked in position by means of a lock-nut 142.

During shut-down of the reactor, the pressure of the primary fluid is reduced and each seal 11 can be slackened. To this end, the nut 14 is unscrewed and then re-screwed to a limit position without being tightened. Due to the residual compression of the rings 111 to 115, the seal 11, which is kept within a limited space by the ring 12, provides a low-pressure seal due to the combination of the biconical seals with the scraper seal, the inner arm of the latter remaining in contact with the exterior surface of the guide tube. The pressure of the seal 11 is not, however, enough to prevent translatory motion of the guide tube. The rings 173, 174 of the seal 17 have also not been tightened so that they too provide a low-pressure seal while enabling the tube to slide. Any leakage which occurs can be discharged through the pipe 137.

The channels 93 are then disconnected and moved away from the respective connecting piece 15, each nut 16 is unscrewed and removed and each connecting piece 15 is fixed to a translating arm 18 which pulls the guide tube 7 horizontally out of the channel.

The guide tubes are replaced by carrying out the above operations in the reverse order.

To facilitate replacement of the seals, the clamping rings 12 and 175 are made from two sectors straddling the tube and the conical rings are formed with a helical slit as shown in FIG. 5. The seals can therefore be put on each guide tube 7 from the side of the tube, fluid-tightness being maintained due to clamping of the seals. Only a minimum number of components, therefore, need be removed in order to replace a seal.

Since the fuel elements of nuclear reactors are handled only at very long intervals, it is essential for fluid-tightness to be ensured during the long reactor operating period. A sealing device improved to this end is shown in FIG. 4.

This device is similar to that shown in FIGS. 2 and 3 but includes a second seal 19 which is downstream of the seal 11 and similar to seal 11. like seal 11, seal 19 is clamped by means of a nut 20 screwed on to an enlarged end portion 138 symmetrical relative to the end portion 132. During normal operaiton, the seal 11 is locked in position and ensures fluid-tightness and the seal 19 remains slackened. If a leak is detected in the chamber 136, the seal 19 can then be tightened by means of the nut 20; leaks will still be detected in the chamber 136, and the seals 134, 135 will maintain a complete high-pressure seal.

Alternatively, the seal 19 could be used during normal service, the seal 11 being tightened only if a leak is detected, fluid-tightness at the end portions 132, 138 still being preserved.

Under these conditions, if leakage due to wear on the seal 19 is detected, the seal 11 could be tightened and then, after locking the guide tube to prevent it from being displaced as a result of the pressure, the nut 20 could be unscrewed and the sleeve 13 withdrawn in order to replace the seal 19.

Obviously, the invention is not restricted by the details of the embodiment just described, which can be modified within the scope of the invention as defined by the appendent claims.

Due to the use of this special seal, which can provide complete high-pressure fluid-tightness in a locking position and, merely by being slackened, can maintain a low-pressure fluid-tightness, without preventing translatory motion of the guide tubes, the reactor can be made more compact and the length of the instrumentation reduced by placing the measuring room at a lower level.

In the embodiment illustrated the measuring room 9 is placed horizontally below the level of the bottom of the reactor vessel. Where such an arrangement is prevented by the reactor layout or, for example, by a narrower shielding enclosure, the level of the measuring room can be raised and possible inclined relative to the horizontal, while still placing the exits from the channels 5 as low down as possible to give the maximum reduction in the guide tube length.

What is claimed is:

1. An installation for measuring and controlling a nuclear reactor of which the core is situated in a pressurised reactor vessel having a removable cover surrounded by a shielding enclosure, the installation having flux measuring apparatus located in a measuring room outside the shielding enclosure operatively connected to a movable flux detector displaceable within a guide tube capable of penetrating into the core by sliding in a channel having one end connected to the vessel bottom and the other end connected to the measuring room, the channel being embedded in the shielding enclosure in a fluid-tight manner, the improvement of locating the measuring room at a level below that of the plane of contact of the cover and of the vessel and the other end of the channel includes means for providing an adjustable seal between the inner surface of the channel and the outer surface of the guide tube, said seal being adjustable between a first condition withstanding the pressure inside the vessel during operation of the reactor, while in a tube locking position, and a second condition permitting sliding of the guide tube during shut-down of the reactor.

2. An installation as claimed in claim 1, said seal including an assembly of a first male and a female frusto-conical ring of resilient material, the rings mating at their conical surfaces, and a scraper seal, the assembly being compressible in an annular chamber at said other end of the channel by a clamping ring adjustable along the axis of the channel.

3. An installation as claimed in claim 2, said scraper seal being an annular member of resilient material having two arms extending parallel to the channel axis and a rigid ring spacing the arms of the annular member on clamping of said scraper seal.

4. An installation as claimed in claim 1, said adjustable sealing means including two seals spaced axially of the channel defining with the channel and the guide tube a leak detection chamber connected to a drainage duct.

5. An installation as claimed in claim 4, said leak detection chamber being filled with non-active fluid at a pressure greater than that in the vessel.

6. An installation as claimed in claim 2 said seal including a second male and female frusto-conical ring inverted with respect to said first rings and situated on the opposite side of the scraper seal.

7. An installation as claimed in claim 6, each frusto-conical ring having a helical slit.

* * * * *